United States Patent
Altmann

(10) Patent No.: US 7,123,307 B1
(45) Date of Patent: Oct. 17, 2006

(54) CLOCK JITTER LIMITING SCHEME IN VIDEO TRANSMISSION THROUGH MULTIPLE STAGES

(75) Inventor: William C. Altmann, San Jose, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 648 days.

(21) Appl. No.: 09/905,318

(22) Filed: Jul. 13, 2001

Related U.S. Application Data

(60) Provisional application No. 60/271,331, filed on Feb. 23, 2001.

(51) Int. Cl.
*H04N 7/01* (2006.01)

(52) U.S. Cl. .................................................. 348/497

(58) Field of Classification Search ................ 348/497, 348/584, 723, 512, 518; 375/371–2, 226; 370/516–519; 702/69, 106–107
See application file for complete search history.

(56) References Cited

U.S. PATENT DOCUMENTS

| | | | | |
|---|---|---|---|---|
| 4,847,662 A | * | 7/1989 | Yamada | 355/55 |
| 4,887,279 A | * | 12/1989 | Odenheimer | 375/226 |
| 4,896,271 A | * | 1/1990 | Jenq et al. | 702/72 |
| 4,963,860 A | * | 10/1990 | Stewart | 345/206 |
| 5,652,627 A | * | 7/1997 | Allen | 348/497 |
| 5,822,603 A | * | 10/1998 | Hansen et al. | 712/1 |
| 5,828,414 A | * | 10/1998 | Perkins et al. | 375/240.01 |
| 6,081,299 A | * | 6/2000 | Kesselring | 348/512 |
| 6,377,588 B1 | * | 4/2002 | Osaki | 370/508 |
| 6,380,797 B1 | * | 4/2002 | Macaluso et al. | 327/513 |
| 6,396,850 B1 | * | 5/2002 | de Vito | 370/509 |
| 6,429,902 B1 | * | 8/2002 | Har-Chen et al. | 348/518 |
| 6,463,092 B1 | * | 10/2002 | Kim et al. | 375/219 |
| 6,556,249 B1 | * | 4/2003 | Taylor et al. | 348/497 |
| 6,738,072 B1 | * | 5/2004 | MacInnis et al. | 345/629 |
| 6,771,714 B1 | * | 8/2004 | Liu et al. | 375/326 |
| 6,865,241 B1 | * | 3/2005 | Adkins et al. | 375/372 |

* cited by examiner

*Primary Examiner*—Paulos M. Natnael
(74) *Attorney, Agent, or Firm*—Perkins Coie LLP

(57) ABSTRACT

A scheme to reduce clock jitter is disclosed in applications where video content is transmitted through multiple stages, each having a switch allowing that stage's video stream to be selected. The video data is re-clocked using a new clock at each stage. Before re-clocked, the video data from the preceding stage is scaled into a constant resolution using a digital scaler. Since the downstream stages could re-clock the video as if it were sent at the same frequency, there is no need to anticipate the changeable video frequency and to create the necessary low-jitter clock in programmable logic.

19 Claims, 5 Drawing Sheets

CLOCK JITTER LIMITING SCHEME IN VIDEO TRANSMISSION THROUGH MULTIPLE STAGES

RELATED APPLICATION

This application claims the benefit of co-pending U.S. Provisional Application Ser. No. 60/271,331, filed Feb. 23, 2001, entitled "Clock Jitter Limiting Scheme Using Digital Scaling."

BACKGROUND OF THE INVENTION

1. Technical Field

This invention relates to data communications. More specifically, the invention relates to digital scaling to limit clock jitter in video transmission through multiple stages.

2. Description of the Related Art

Some display applications require transmission of video content through multiple stages in a daisy chain, each with a switch allowing that stage's video stream to be selected between the video stream from the preceding stage and the video stream from another source at each stage. As the video stream proceeds from one stage to the next across multiple links, the jitter content in the clocking accumulates. This jitter creates an inherent limitation to the number of links that can be timed without correction. When the jitter exceeds the specification for the link technology, the video data is corrupted.

This process is complicated by the fact that the video stream may be transmitted at any of a variety of frequencies. Although the downstream stages could re-clock the video if it were always sent at the same frequency, it is problematic for these downstream stages to anticipate the changeable video frequency and to create the necessary low-jitter clock in programmable logic.

FIG. 1 shows a conventional method of daisy-chaining digital video signals through multiple stages, each having its own host system. On each host system such as a system 10, a signal containing digital video from the preceding system enters through a receiver chip ('RX') 11. The host selects either its own video stream (from the 'VGA' chip) 12 or passes through the stream from the preceding stage, using a multiplexer ('MUX') 13. The multiplexer switches the data signals, the control signals, and the clock into the transmitter ('TX') 14, which outputs through a connection to the next host system of RX 15, VGA 16, MUX 17 and TX 18.

Since jitter accumulates on a clock signal whenever it passes through additional circuitry, the jitter arriving through the 'RX' device is aggravated by the multiplexer and transmitter circuitry as it passes to the next host stage.

FIG. 2 shows a conventional method of reducing the jitter accumulation by creating a new clock at each stage of the video switching. In a host system such as a system 20, either the digital video from the preceding host system entering through a receiver chip ('RX') 21 or the digital video from own video stream (from the 'VGA' chip) 22 is selected using a multiplexer 23. The selected video is gated with a new clock ('OSC') 24 before being transmitted using a transmitter ('TX') 25, which outputs through a connection to the next host system of RX 26, VGA 27, MUX 28, OSC 29 and TX 30.

If the jitter characteristic of the new clock is better than the received clock, then the accumulation will be slower. If the new clock has extremely small jitter (such as from a crystal source), then the jitter accumulation will be so small as to allow a number of stages to be connected in series.

However, there are still problems in such schemes. The phase of the new clock must be matched to the phase of the data and control signals arriving through the receiver, to guarantee proper setup and hold margins at each transmitter input. Adjusting the phase is difficult for a design handling multiple video frequencies. A system with multiple possible video frequencies will also require a re-programmable clock that always maintains very small jitter. Each stage of the chain must know the required frequency for data received by it from earlier stages. This is a problem for general-purpose systems where multiple video frequencies are used.

Therefore, there is a need for a new scheme to reduce clock jitter during video transmission across multiple stages without the necessity of adding a re-programmable clock source at each stage.

SUMMARY OF THE INVENTION

It is an object of the present invention to limit clock jitter as video content is transmitted in multiple stages.

The foregoing and other objects are accomplished by providing at each stage a digital video scaler (DVS) for producing a constant resolution display from the incoming video data before re-clocking the video data so that a clock source of a constant frequency may be used for re-clocking.

DETAILED DESCRIPTION OF THE INVENTION

Figure 3:
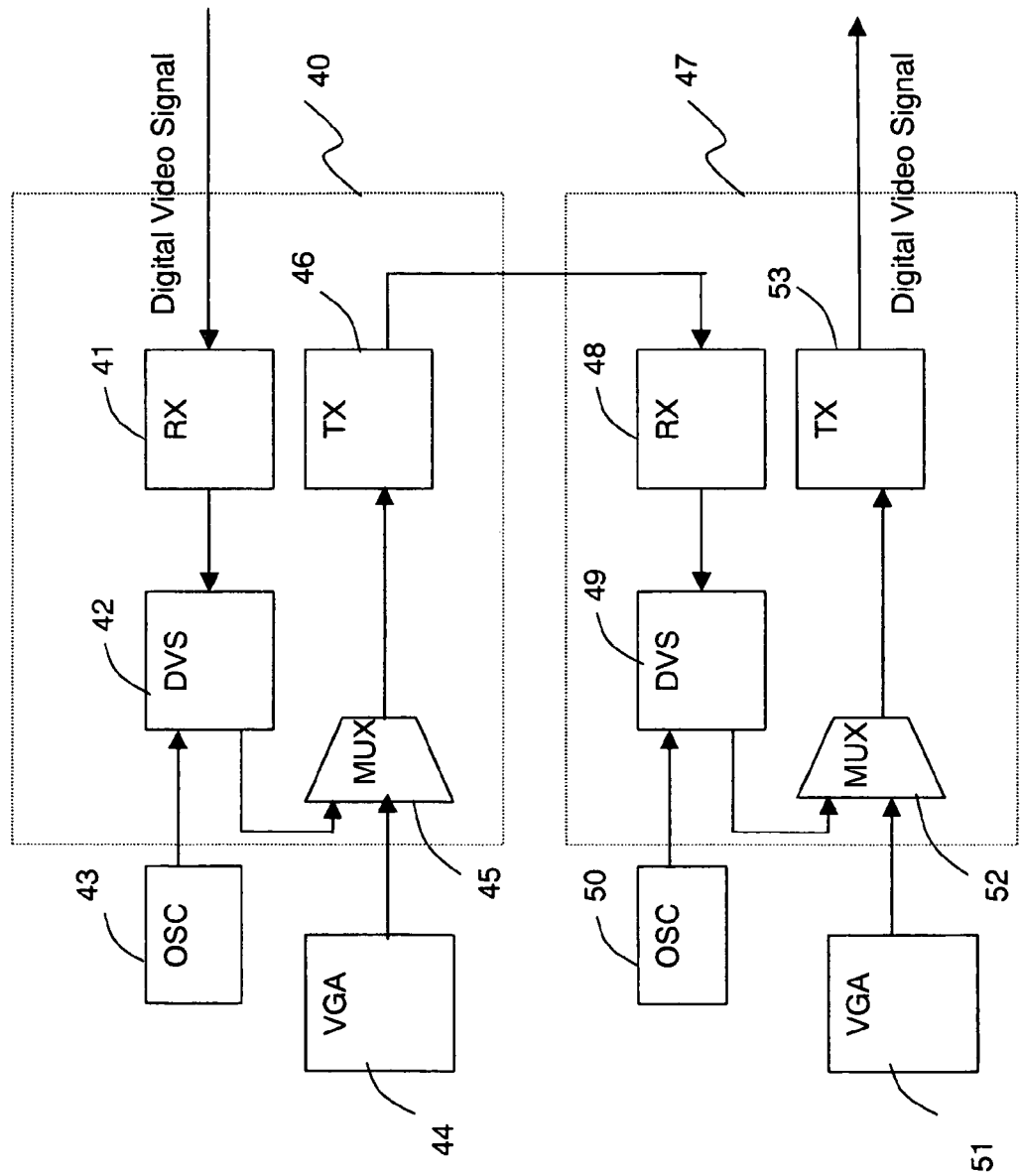
FIG. 3 is a schematic block diagram of the present invention for reducing jitter using a digital video scaler (DVS).

FIG. 3 shows a system of the present invention for limiting clock jitter based on the methodology of daisy-chaining multiple systems together using a digital scaling solution. The system 40 includes a receiver ('RX') 41 for receiving video signals from the preceding system, a digital video scaler ('DVS') 42, a multiplexer ('MUX') 45, and a transmitter ('TX') 46.

The RX 41 accepts high-speed signals containing digital video using an interface technology, such as Transition Minimized Differential Signaling (TMDS) or Low-Voltage Differential Signaling (LVDS). For more details on TMDS, refer to refer to DVI Specification Revision 1.0, Apr. 2, 1999 from Digital Display Working Group (DDWG).

These signals may arrive at a variety of frequencies according to the mode of display used. The display mode includes a resolution (for example, 1024 rows by 768 columns) as well as a refresh rate and blanking times. These parameters combined define a unique clock rate. The digital video data received by the RX 41 is processed by the DVS 42, which scales the received digital video data to a constant resolution using a constant-frequency clock ('OSC') 43. The DVS 42 may be part of a digital visual controller (DVC). The MUX 45 selects either its own video stream (from the 'VGA' chip) 44 or the scaled video stream from the DVS to send it to the next host system using a transmitter ('TX') 46, which outputs through a connection to the next system 47 having RX 48, DVS 49, MUX 52 and TX 53.

Figure 4:
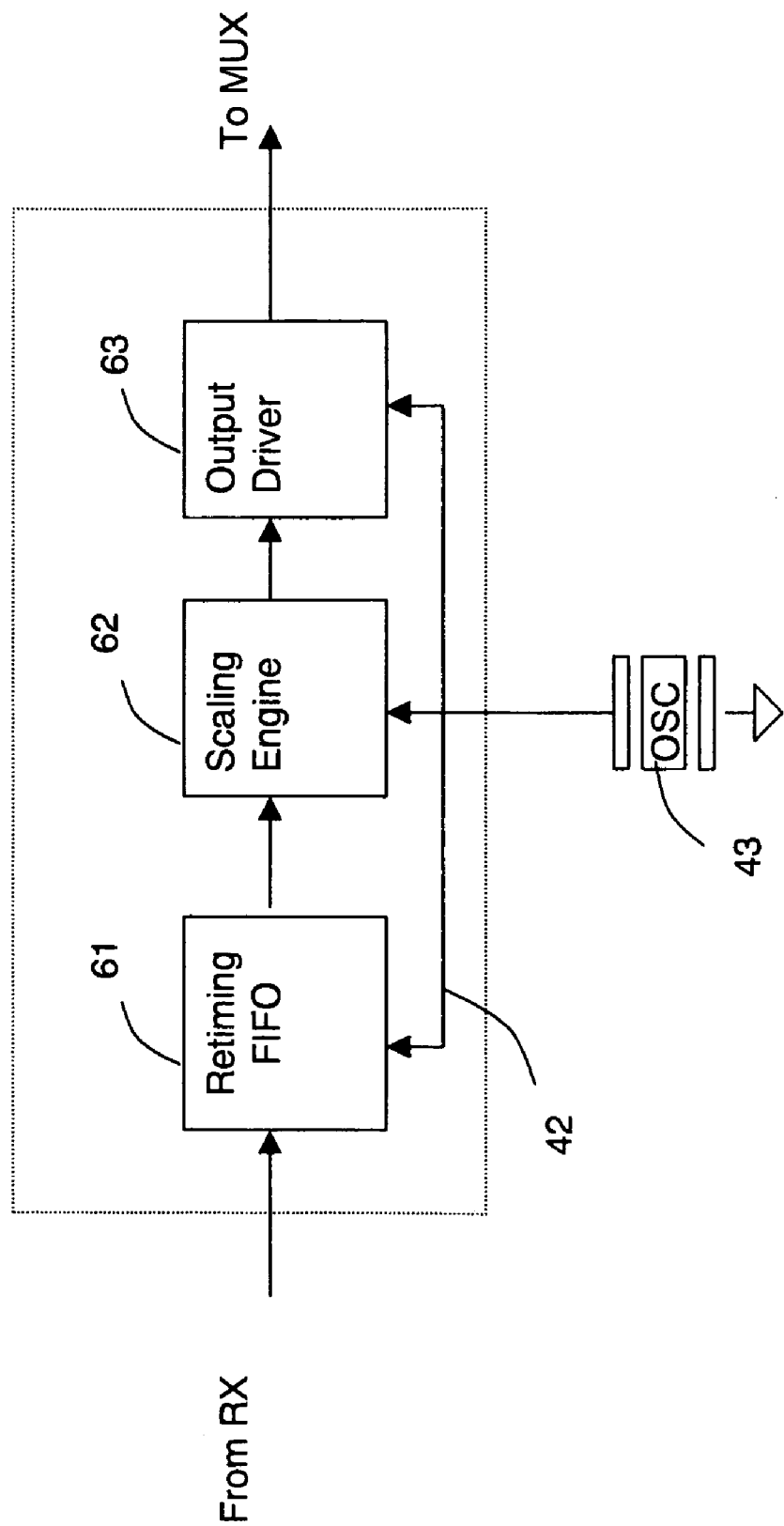
FIG. 4 is a schematic block diagram of the DVS.

FIG. 4 further shows a detailed block diagram of the DVS 42, which includes a retiming first-in-first-out queue ('FIFO') 61, a scaling engine 62, and an output driver 63. The digital video data received by the RX 41 of FIG. 3 enters the retiming FIFO 61 so that the data is written into the FIFO 61 using the frequency defined by the display mode. The data is extracted from the retiming FIFO 61 using the constant-frequency oscillator clock ('OSC') 43. Since this frequency is constant, all ports downstream from this point will respond to the same frequency of information, with no need to perform additional scaling. The data drawn from the FIFO is processed by the scaling engine 62, which creates additional pixel points by interpolation ('scaling') algorithms, which are well known to those skilled in the art. All required display modes are scaled to a constant output timing by this block. The scaled information is driven through the output driver 63, from which it emerges again as a digital data stream. This digital data stream is transmitted to the next receiver block in the daisy chain by using the TX 46 of FIG. 3.

Figure 1:
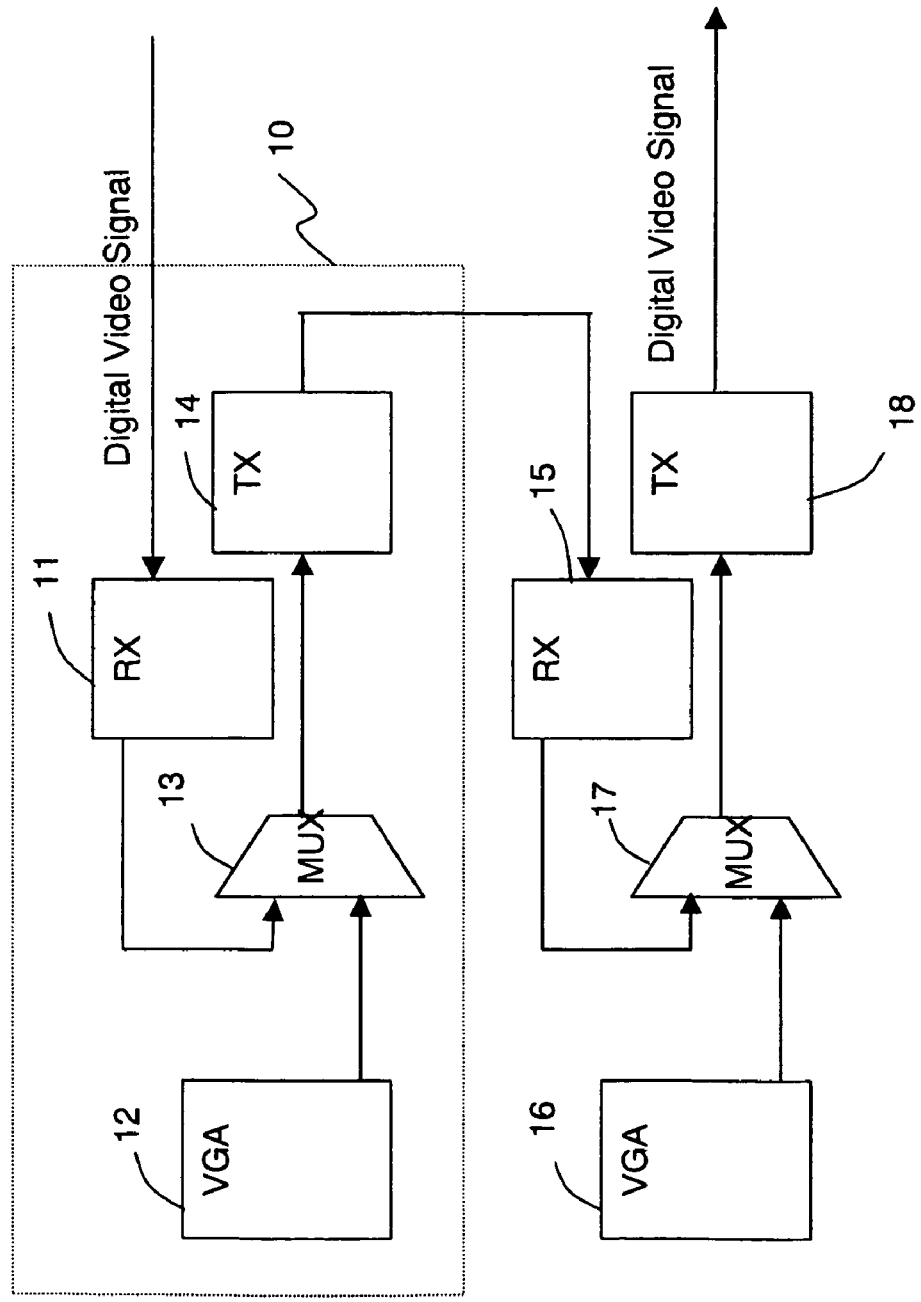
FIG. 1 is a schematic block diagram of a conventional method for chaining video signals through multiple stages.
Figure 2:
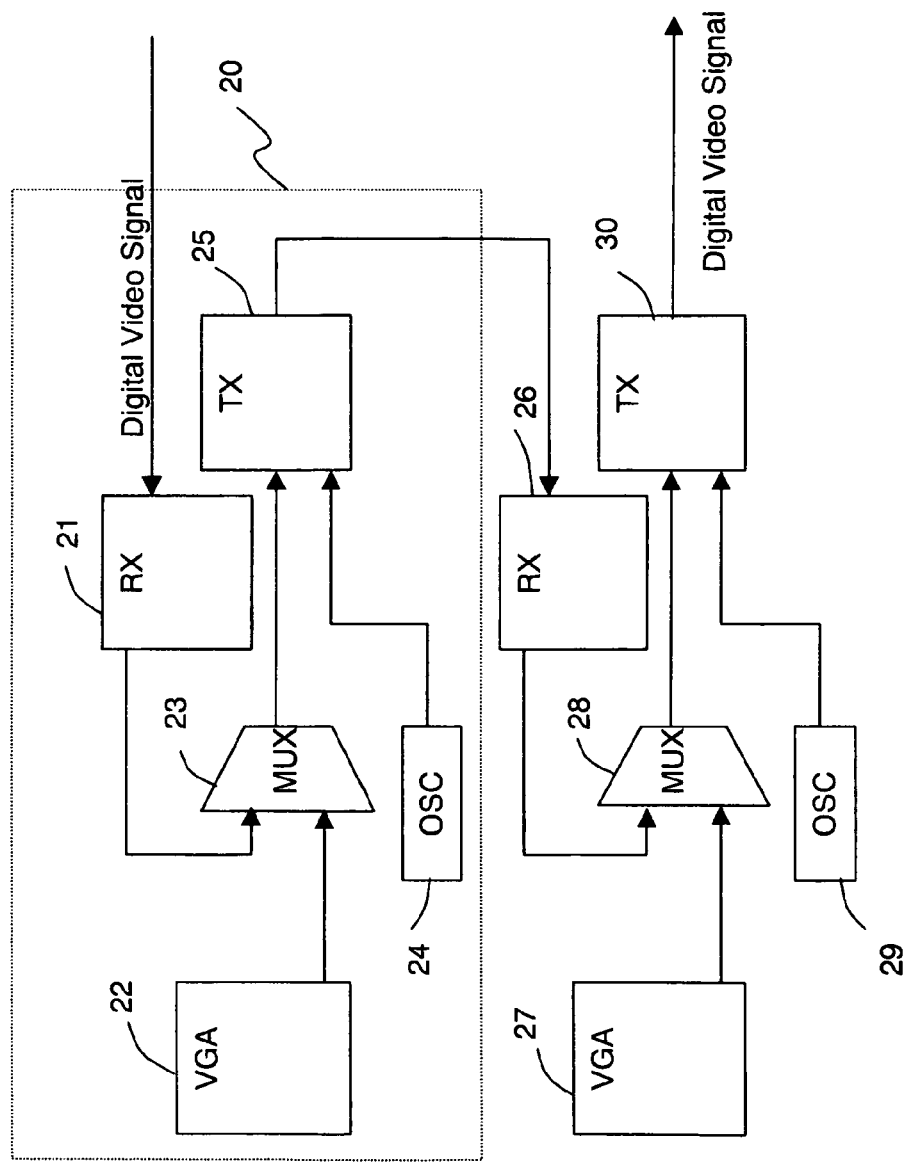
FIG. 2 is a schematic block diagram of a conventional method for reducing jitter by adding a new clock source at each stage.

The present invention differs from the conventional method in FIG. 2 in that the present invention may use a constant-frequency oscillator for the new clock. Since the output of the DVS is always a video stream of the same resolution, each stage of the chain does not need to know the frequency of its incoming video stream.

Figure 5:
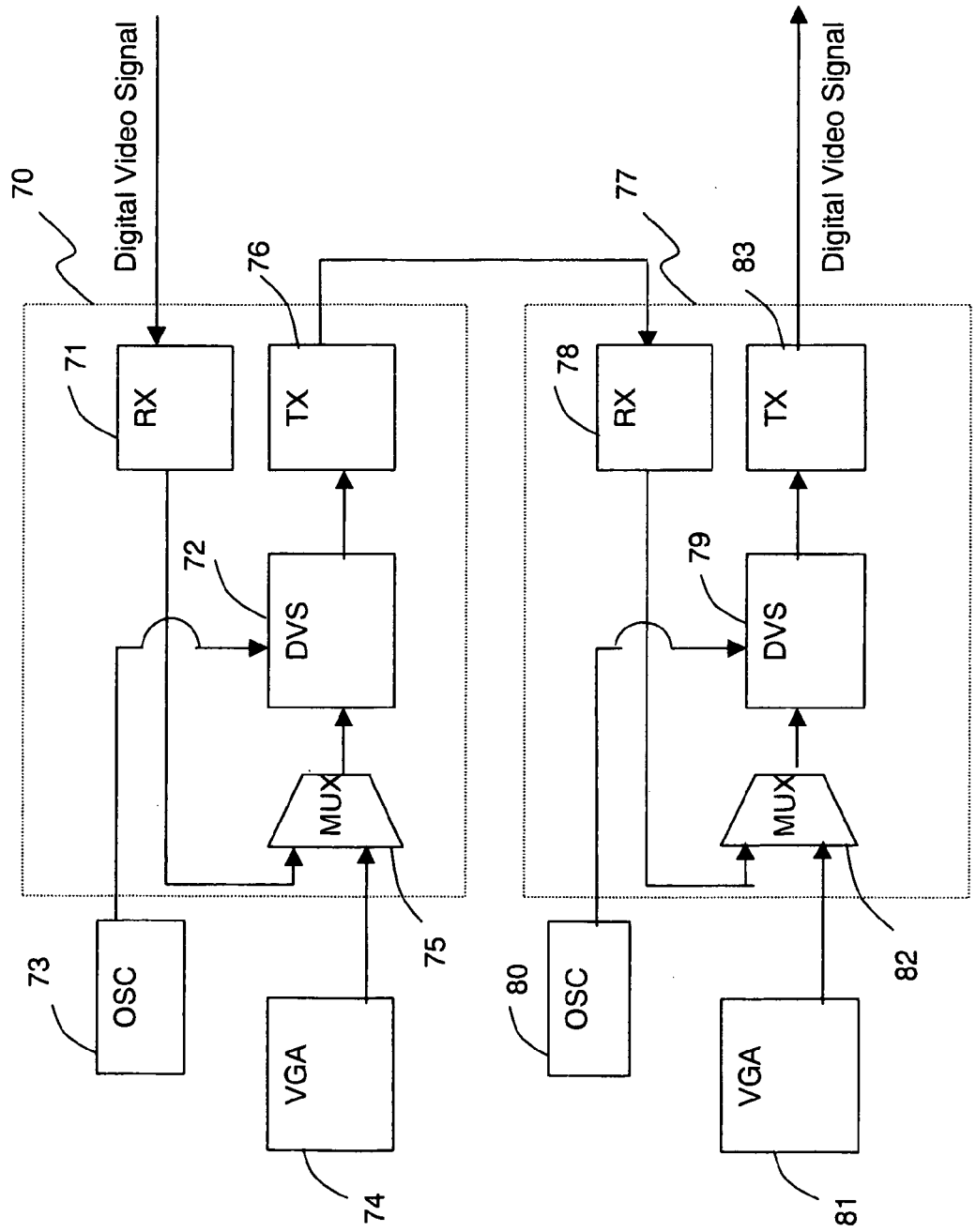
FIG. 5 is a schematic block diagram of an alternative embodiment of the present invention.

FIG. 5 shows an alternative implementation of the present invention. The system 70 is different from the system in FIG. 3 in that the received digital video data by a RX 71 is multiplexed with its own data stream (from VGA 74) before being scaled by a DVS 72 and transmitted by a TX 76 to the next system 77.

The video stream emerging from the DVS such as 42, 49, 72 and 79 is designed to be of a constant resolution according to the capabilities of the overall system. It may be selected as the native resolution of the intended display device, or simply a resolution compatible (through up-scaling or down-scaling) with all of the possible resolutions driven by the host systems' VGA controllers.

There are numerous benefits using the present invention. Since the present invention uses a constant-frequency oscillator, the oscillator can be designed to have minimal jitter. Since the oscillator need not be re-programmable, it can be designed to drive the multiplexer and the transmitter to meet their specifications, regardless of the phase and frequency of the original video data and clock.

The requirements of the display device are also simplified, as it will always be driven by the same video resolution and frequency. There is no need for a multiple-resolution display, such as a CRT or a scaling flat panel monitor.

Since the DVS may be part of a digital visual controller (DVC), other features of the DVC logic may also be incorporated into this solution, such as eliminating the separate multiplexer, and superimposing an on-screen display (OSD) message on the video stream according to which DVC is performing the scaling from the original video content.

By using the present invention, the signals at each stage are not limited to using the same interface technology. Since digital scaling is done at each stage, one stage using TMDS, for example, may be followed by another stage using LVDS.

While the invention has been described with reference to preferred embodiments, it is not intended to be limited to those embodiments. It will be appreciated by those of ordinary skilled in the art that many modifications can be made to the structure and form of the described embodiments without departing from the spirit and scope of this invention.

What is claimed is:

1. A system for transmitting from a current stage having a host system to a next stage with limited clock jitter, a signal containing either digital video from a preceding stage or digital video from the host system of the current stage, comprising:
    a digital video scaler (DVS) for reclocking the digital video received from the preceding stage to a constant frequency;
    a constant-frequency clock connected to the DVS; and
    a multiplexer for selecting either the reclocked digital video from the DVS or the digital video from the host system of the current stage,
    wherein a single DVS is also contained in the preceding stage, the next stage and subsequent stages such that the video signal is reclocked by the DVS at each stage.

2. The system of claim 1, wherein said DVS comprises:
    a retiming FIFO for retiming the digital video received from the preceding stage; and
    a scaling engine for scaling the retimed digital video to match a constant resolution.

3. The system of claim 1, further comprising a receiver for receiving a signal containing digital video from the preceding stage.

4. The system of claim 1, wherein said signal is a Transition Minimized Differential Signaling (TMDS) signal.

5. The system of claim 1, wherein said signal is a Low-Voltage Differential Signaling (LVDS) signal.

6. The system of claim 1, wherein said signal contains audio.

7. A method of transmitting from a current stage having a host system to a next stage with limited clock jitter, a signal containing either digital video from a preceding stage or digital video from the host system of the current stage, comprising the steps of:
    reclocking the digital video received from the preceding stage to a constant frequency using a constant-frequency clock; and
    selecting between the reclocked digital video and the digital video from host system of the current stage,
    wherein the reclocking of the digital video is performed by a single DVS contained in the preceding stage, the next stage and subsequent stages such that the video signal is reclocked by the DVS at each stage.

8. The method of claim 7, wherein said step of reclocking comprises the steps of:
    retiming the digital video received from the preceding stage; and
    creating video data matching a constant resolution from the retimed video data.

9. The method of claim 7, wherein said step of reclocking further comprises the step of superimposing an on-screen display (OSD) message.

10. The method of claim 7, wherein the signal is a Transition Minimized Differential Signaling (TMDS) signal.

11. The method of claim 7, wherein the signal is a Low-Voltage Differential Signaling (LVDS) signal.

12. The method of claim 7, wherein the signal contains audio.

13. A method of transmitting from a current stage having a host system to a next stage with limited clock jitter, a signal containing either digital video from a preceding stage or digital video from the host system of the-current stage, comprising the steps of:

selecting between the digital video from the preceding stage and the digital video from the current stage; and reclocking the selected digital video to a constant frequency using a constant-frequency clock wherein the digital video is also reclocked at the previous stage, the next stage and subsequent stages by a single DVS contained in the preceding stage, the next stage and subsequent stages such that the video signal is reclocked by the DVS at each stage.

14. The method of claim 13, wherein said step of reclocking the selected digital video comprises the steps of:

retiming the selected digital video using a FIFO; and creating video data matching to the constant resolution from the retimed data.

15. The method of claim 13, wherein the signal is a Transition Minimized Differential Signaling (TMDS) signal.

16. The method of claim 13, wherein the signal is a Low-Voltage Differential Signaling (LVDS) signal.

17. A system for transmitting, from a current stage having a host system to a next stage with limited clock jitter, a signal containing either digital video from a preceding stage or digital video from the host system of the current stage, comprising:

a multiplexer for selecting either received digital video from the preceding stage or the video from the host system of the current stage;

a digital video scaler (DVS) for reclocking the digital video received from the multiplexer to a constant frequency; and a constant-frequency clock connected to the DVS, wherein a single DVS is also contained in the preceding stage, the next stage and subsequent stages such that the video signal is reclocked by the DVS at each stage.

18. The system of claim 17, wherein said DVS comprises: a retiming FIFO for retiming the received video from the multiplexer, and a scaling engine for scaling the retimed video data to a constant resolution.

19. A digital video scaler for reducing jitter in a video signal comprising:

a jitter-reducing retiming FIFO buffer having a clock input receptive to a video signal; and a scaling engine having a scaling engine input coupled to said retiming FIFO buffer whereby said retiming FIFO buffer and said scaling engine are clocked by a common clock, wherein the digital video scaler is contained in a preceding stage, a next stage and subsequent stages such that the video signal is reclocked by the digital video scaler at each stage.

\* \* \* \* \*